(12) United States Patent
Mahmoud et al.

(10) Patent No.: US 10,515,148 B2
(45) Date of Patent: Dec. 24, 2019

(54) ARABIC SPELL CHECKING ERROR MODEL

(71) Applicant: KING FAHD UNIVERSITY OF PETROLEUM AND MINERALS, Dhahran (SA)

(72) Inventors: Sabri A. Mahmoud, Dhahran (SA); Wasfi G. Al-Khatib, Dhahran (SA); Tamim Alnethary, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 73 days.

(21) Appl. No.: 15/891,563

(22) Filed: Feb. 8, 2018

(65) Prior Publication Data

US 2019/0188255 A1 Jun. 20, 2019

Related U.S. Application Data

(60) Provisional application No. 62/599,396, filed on Dec. 15, 2017.

(51) Int. Cl.
*G06F 17/00* (2019.01)
*G06F 17/27* (2006.01)
(Continued)

(52) U.S. Cl.
CPC ........ *G06F 17/273* (2013.01); *G06F 17/2217* (2013.01); *G06F 17/2223* (2013.01); *G06F 17/2755* (2013.01); *G06F 17/2863* (2013.01)

(58) Field of Classification Search
CPC ............................ G06F 17/273; G06F 17/2755
See application file for complete search history.

(56) References Cited

U.S. PATENT DOCUMENTS 6,023,536 A * 2/2000 Visser ...................... G06K 9/72
382/229
7,072,827 B1 * 7/2006 Carmel ............... G06F 17/2715
704/9
(Continued)

FOREIGN PATENT DOCUMENTS

KR 10-1621154 B1 5/2016

OTHER PUBLICATIONS

Design and Implementation of Morphology Base Spell Checker, (Gaddisa Olani Ganfure and Dr. Dida Midekso, International Journal of Scientific & Technology Research vol. 3, Issue 12, Dec. 2014, 8 pages.*

(Continued)

*Primary Examiner* — Scott T Baderman
*Assistant Examiner* — Barbara M Level
(74) *Attorney, Agent, or Firm* — Oblon, McClelland, Maier & Neustadt, L.L.P.

(57) ABSTRACT

Disclosed is a data driven error model that is based on error patterns found at the morphemes level. A model is generated by error-correct patterns generator and is stored in an error-correct patterns database (ECPD). The ECPD is used in conjunction with a correction candidates' generator (CCG) to provide a list of correction candidates for a given error word. The error model can learn the types and forms of the language patterns from an annotated corpus. The error model can be used to analyze the type of error and can provide candidates corrections for wide ranges of Arabic spelling errors.

19 Claims, 13 Drawing Sheets

(51) Int. Cl.
*G06F 17/22* (2006.01)
*G06F 17/28* (2006.01)

(56) References Cited

U.S. PATENT DOCUMENTS

| | | |
|---|---|---|
| 9,037,967 B1 | 5/2015 | Al-Jefri et al. |
| 2005/0071148 A1* | 3/2005 | Huang ................ G06F 17/2755 704/4 |
| 2010/0070261 A1* | 3/2010 | Jin ...................... G06F 17/2755 704/2 |
| 2013/0124492 A1* | 5/2013 | Gao ...................... G06F 17/273 707/706 |
| 2016/0180742 A1 | 6/2016 | Lee et al. |

OTHER PUBLICATIONS

Khaled Shaalan, et al., "Towards Automatic Spell Checking for Arabic", Conference Paper, Oct. 2003, 8 pages.

\* cited by examiner

|   | EE (Error Encoding) | CC (Correction Code) | Error operation |
|---|---|---|---|
| 0 | - | " | No change |
| 1 | i | " | Insertion |
| 2 | d | 'Arabic char' | Deletion |
| 3 | s | 'Arabic char' | Substitution |
|   | Latin characters | 'Latin char' | Transposition |

FIG. 4

Step 1

| | | | | | | | | |
|---|---|---|---|---|---|---|---|---|
| CW | ن | ا | $ | م | ب | ح | $ | ل | ا |
| EW | | | ن | ي | م | ح | ب | ا | ا |
| CW Label | E | ا | $ | D | C | B | $ | A | A |
| EW Label | | | E | ي | D | B | C | A | A |

Step 2

| | | | | | | | | |
|---|---|---|---|---|---|---|---|---|
| CW Label | E | ا | $ | D | C | B | $ | A | A |
| CP | ن | ا | $ | ل | ع | ف | $ | ل | ا |
| CP Label | E | ا | $ | D | C | B | $ | A | A |

Step 3

| | | | | | | | | |
|---|---|---|---|---|---|---|---|---|
| CP | ن | ا | $ | ل | ع | ف | $ | ل | ا |
| CP Label | E | ا | $ | D | C | B | $ | A | A |
| EW Label | | | E | ي | D | B | C | A | A |
| iEP | | | ن | ي | ل | ف | ع | ل | ا |
| iEP Label | | | E | ي | D | B | C | A | A |

FIG. 5A

Step 4

| CP Label | E | ׀ | S | D | C | B | S | A | A |
|---|---|---|---|---|---|---|---|---|---|
| iEP Label |  | E | ي | D | B | C | A | A |  |
| EE | - | s | S | - | B | C | S | - | - |
| CC |  | ׀ | S | C | B | S |  |  |  |

Step 5

| EE | - | s | S | - | B | C | S | - | - |
|---|---|---|---|---|---|---|---|---|---|
| iEP |  | ن | ي | ل | ف | ع | ل | ا |  |
| EP | ن | ي | S | ل | ف | ع | S | ل | ا |

FIG. 5B

| CP\iEP | A | A | $ | B | C | D | $ | ¦ | E |
|---|---|---|---|---|---|---|---|---|---|
| A | '0';'' | | | | | | | | |
| A | | '0';'' | | | | | | | |
| C | | | '$';'$' | 'C';'B' | | | | | |
| B | | | | | 'B';'C' | | | | |
| D | | | | | | '0';'' | | | |
| $ | | | | | | | '$';'$' | '?';'?' | |
| E | | | | | | | | | '0';'' |

| Error Word | | | | | | | Correction Information | | | | | |
|---|---|---|---|---|---|---|---|---|---|---|---|---|
| | | | | | | | CSP | CP | CPP | Root | Correction | Valid |
| | | | | | | | | مفتعل | ال | سمع | الکمستمع$ | True |
| EWord | ع | م | ت | س | م | ل | ا | ون | مفتعل | ال | سمع | الکمستمعون | True |
| Pattern | ل | ع | ت | ف | م | ل | ا | | | | | | |
| | | | | | | | | | | | | |
| | | | | | | | | | | | | |

FIG. 10

ARABIC SPELL CHECKING ERROR MODEL

CROSS-REFERENCE TO RELATED APPLICATIONS

This application claims the benefit of priority to provisional application No. 62/599,396 filed Dec. 15, 2017, the entire contents of which are incorporated herein by reference.

FIELD OF DISCLOSURE

The present disclosure relates generally to generating correction candidates for spell checking, and is applicable to generating correction candidates in a morphological-rich language in which words are derived from a finite set of morphological patterns, in particular the Arabic language.

BACKGROUND

Generating suitable correction candidates has become an ever increasingly required feature in any spell checking and correction system. Correction candidates' generators generally calculate a set of scores describing the similarity between an error word and the possible corrections. The most commonly used approach for generating correction candidates in Arabic is employing the edit distance. Other approaches generate correction candidates based on specific words. A further approach has been to perform analysis of error detection and correction at the sentence level.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

RELATED ART

Bakkali, et. al. proposed the use of a small size dictionary of stems to represent Arabic to help correcting spelling errors, instead of using a large dictionary. (See Bakkali, H., et al. "For an Independent Spell-Checking System from the Arabic Language Vocabulary." *International Journal of Advanced Computer Science and Applications* 5 (2014), herein incorporated by reference in its entirety). This dictionary is similar to the one used by Buckwalter Aramorph morphological analyzer. For every input word that is not in the dictionary, a distance measure between the morphemes of the analyzed word and the Aramorph lexicon tables is computed and the suggested correction is determined based on the minimum distances. Using a corpus of 2784 misspelled words, the authors reported that their method outperformed the classical Levenshtein approach in terms of the average time (0.10/0.19 ms) and the correction rate (85%/50%).

Nejja, et al. used the concept of surface patterns and roots with the Levenshtein minimum edit distance to generate corrections of the error word. (See Nejja, Mohammed, and Yousfi Abdellah. "Correction of the Arabic derived words using surface patterns." *Codes, Cryptography and Communication Systems (WCCCS)*, 2014 5th Workshop on. IEEE, 2014), herein incorporated by reference in its entirety), herein incorporated by reference in its entirety). Nejja, et al. provides three approaches for the correction process. These approaches are mainly based on selecting the surface pattern that has minimum edit distance with the correct word. The approaches were compared to the Levenshtein edit distance. The performance of the system is reportedly better than that of the edit distance in terms of the execution time and the lexicon size.

A context-based system was suggested to automatically correct misspelled words by Alkanhal, et al. (See Alkanhal, Mohamed, et al. "Automatic stochastic arabic spelling correction with emphasis on space insertions and deletions." *Audio, Speech, and Language Processing, IEEE Transactions on* 20.7 (2012): 2111-2122), herein incorporated by reference in its entirety). The misspelt words are firstly ranked using the Levenshtein edit distance considering space insertion and space deletion errors. The most correct candidate for each misspelled word is then selected according to the maximum marginal probability via A* lattice search and N-gram probability estimation. They reported an improved performance reaching F-scores of 97.9% and 92.3% for detection and correction, respectively, based on their manually annotated corpora.

Hassan, Y. et. al., proposed a system that targets the detection and correction of several error types of QALB shared task corpus, including edit, add before, merge and split errors. (See Hassan, Y., Aly, M., & Atiya, A. (2014). Arabic Spelling Correction using Supervised Learning. *arXiv preprint arXiv:* 1409.8309), herein incorporated by reference in its entirety). The system detects erroneous words by applying Buckwalter morphological analyzer. For each detected "Edit" and "add before" errors, classifiers with contextual features are used to correct them. A random insertion and omitting of a space were maintained to correct merge and split errors. They reported 58% F1 error correction score with 59% and 58% recall and precision, respectively.

Hicham introduced an approach for correcting errors that result from insertion, deletion and substitution operations. (See Hicham, Gueddah. "Introduction of the weight edition errors in the Levenshtein distance." *arXiv preprint arXiv:* 1208.4503 (2012)), herein incorporated by reference in its entirety). When ranking candidates, Hicham used the frequency of change operations with the Levenshtein distance. This approach achieved better performance than using Levenshtein edit distance alone.

Shaalan, et al., 2012 created a large-coverage word list for Arabic of 13 million words, with 9 million having fully inflected valid surface words using AraComLex, an open-source finite-state large-scale morphological transducer. (See Shaalan, Khaled F., et al. "Arabic Word Generation and Modelling for Spell Checking." *LREC.* 2012), herein incorporated by reference in its entirety). From a large list of valid forms and invalid forms, he created a character-based trigram language model to approximate knowledge about permissible character clusters in Arabic, creating a novel method for detecting spelling errors. He also created a context-independent spelling correction tool using a finite-state automaton that measures the edit distance between input words and candidate corrections. He matched the word against the list to detect whether it was an error word or not. If it is an error word, he used finite-state automata to propose candidate corrections within a specified edit distance measured by the Levenshtein distance from the misspelled word. After choosing candidate corrections, he used the noisy channel model trained on a corpus of one-billion words, and knowledge-based rules to assign scores to the candidate corrections and choose the best correction, independent of the context. The knowledge-based rules focused on the most common types of errors.

Mahdi implemented a spell checker that uses morphological analysis for the detection of non-word spelling errors. (See Mahdi, Adnan. 2012. "Spell Checking and Correction for Arabic Text Recognition." Master's thesis, KFUPM University, Department of Information & Computer Science, herein incorporated by reference in its entirety). The word identified as spelling error if a table look-up fails to match the generated morpheme. Once an error is detected, suggested corrections are generated based on Levenshtein distance. No test data or results were discussed in this work.

Attia, et al. developed knowledge-based re-ranking rules for reordering and constraining the number of candidates generated though the Levenshtein edit distance. (See Attia, Mohammed, et al. "Improved Spelling Error Detection and Correction for Arabic." COLING (Posters). 2012), herein incorporated by reference in its entirety). He showed that careful selection of the language model training data based on the amount of noise present in the data, has the potential to further improve the overall results. Their method significantly outperforms the three industrial applications of Ayaspell, MS Word, and Google Docs in first order ranking of candidates.

Hassan, A., et al. proposed a language independent method for detecting and correcting spelling errors. (See Hassan, Ahmed, Sara Noeman, and Hany Hassan. "Language Independent Text Correction using Finite State Automata." *IJCNLP.* 2008), herein incorporated by reference in its entirety). Error detection is based on finite state automata while candidates' generation was handled using a Levenshtein-transducer that is compatible with the finite state machine. Ranking candidates was handled using the n-gram language model. Hassan, A, et al. reported an accuracy of 89% based on Arabic and English text. Shaalan, et al., 2003, developed an Arabic morphological analyzer that is able to recognize common spelling errors for standard Arabic and Egyptian language dialects. (See Shaalan, Khaled, Amin Allam, and Abdallah Gomah. "Towards automatic spell checking for Arabic." *Conference on Language Engineering, ELSE, Cairo, Egypt.* 2003), herein incorporated by reference in its entirety). Shaalan, et al., 2003 used a heuristic approach that attempts to find the correction of the error. Shaalan, et al., 2003 built the system using prolog.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a table including example error encodings according to an exemplary aspect of the disclosure;

FIGS. 5A, 5B is an example of steps in the error-correct patterns generator algorithm according to an exemplary aspect of the disclosure;

FIG. 6 is an example of the error encoding and correction code of step 4 of the flowchart of FIG. 3;

FIG. 7 is an example of error patterns generated by the error-correct patterns generator of FIG. 3;

FIG. 8 is an example of data for the error correct patterns database according to an exemplary aspect of the disclosure;

FIG. 10 is a table showing examples of error patterns according to an exemplary aspect of the disclosure.

DETAILED DESCRIPTION

Figure 1:
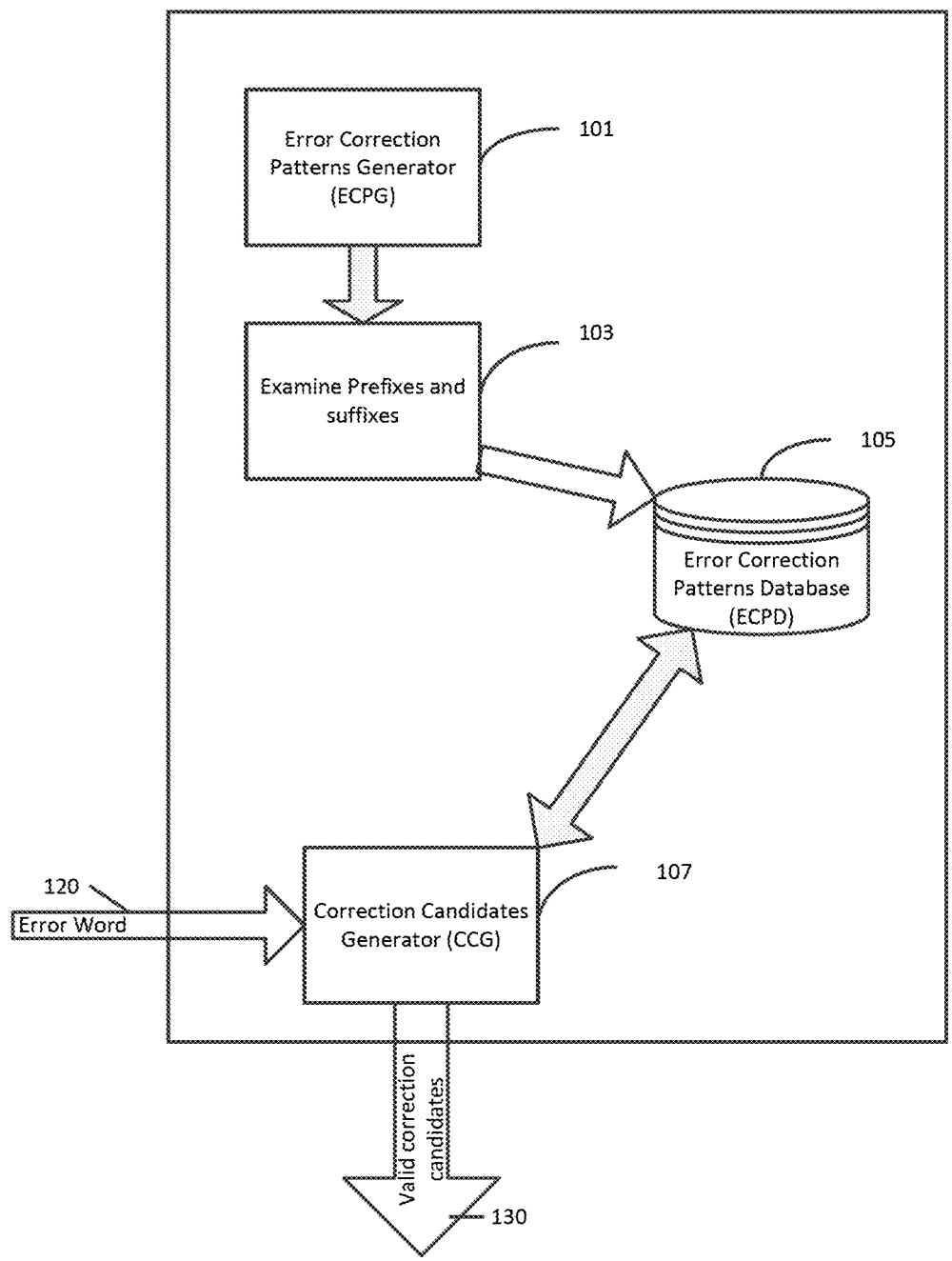
FIG. 1 is a block diagram of a data driven system according to an exemplary aspect of the disclosure.

Referring now to the drawings, wherein like reference numerals designate identical or corresponding parts throughout several views, the following description relates to a spell checking error model for generating correction candidates for a particular error word.

The Arabic language is considered to be one of the morphologically rich languages, since many of its words are derived from a finite set of morphological patterns. Arabic is considered to be one of the Semitic languages, which are known for their morpheme diversity. For example, in Arabic, every derived word follows a specific morphological pattern that centers around, usually a 3-letter root word, along with any of the allowable prefixes, suffixes and inflictions, if any. Root words that have more than 3 letters are rare. Subsequently, Arabic morphology assigns the pattern فعل to each such root word, where the first letter corresponds to ف, the second letter corresponds to ع, and the third letter corresponds to ل. In addition, not every prefix and/or suffix generates proper derived Arabic words.

As mentioned above, various approaches to implementing spell checkers generally focus on analyzing a word. The inventors for the present disclosure have determined that morphological patterns in words can be utilized in generating smarter candidate words for correcting spelling errors. Such a morphological pattern-based model preferably possesses the following properties:

1. The correction candidates must be generated in a way where the number of candidates is relatively small, yet contain the correct word.
2. The model must be general, and not specific to a certain type of spelling errors.
3. The model must provide a ranking for the correction candidates, such that the correct word is preferably at the top of the list.

Disclosed is a data driven system that exploits morphological error patterns at morphemes or word levels. Although examples are disclosed that are based on the Arabic language, the disclosure applies to other languages that are morphologically rich, such as other Semitic languages. An aspect is an error pattern that is associated with a single morphological pattern, which may be applied to any specific word.

FIG. 1 is a block diagram of a data driven system according to an exemplary aspect of the disclosure. The components of the system include an error-correct patterns generator 101 (ECPG), an error-correct patterns database 105 (ECPD) and a correction candidates' generator 107 (CCG). The ECPG 101 is a component that generates morphological error patterns and their correction information to be used for the correction process. The information generated by the ECPG 101 is used to build the ECPD 105.

The ECPD 105 may be used in conjunction with the CCG 107 to generate the correction candidates 130 for a given error word 120.

The ECPD 105 and CCG 107 for generating correction candidates 130 for a given error word 120 may be incorporated into a variety of systems. For example the disclosed data driven system may be incorporated as a spell checking feature in a word processing program, or may be incorporated as part of a grammar checker. The disclosed data driven system may be incorporated as part of a voice recognition system where speech input is displayed as text output. In the later example, the source of the error word is a computer generated word derived from the speech input.

Error Correction Patterns Generator (ECPG)

Figure 2A:
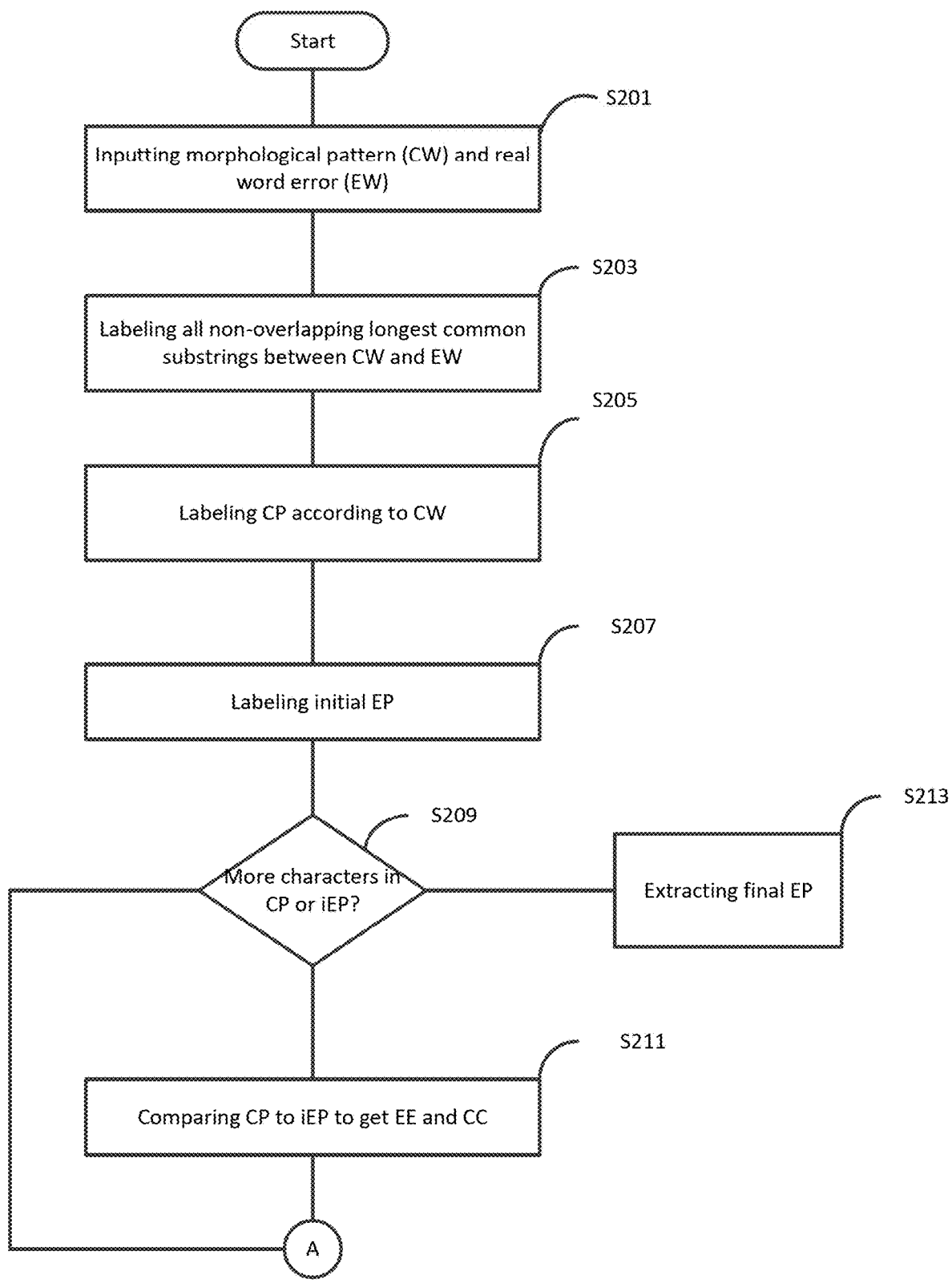
FIGS. 2A, 2B is a flowchart for the error-correct patterns generator according to an exemplary aspect of the disclosure.
Figure 2B:
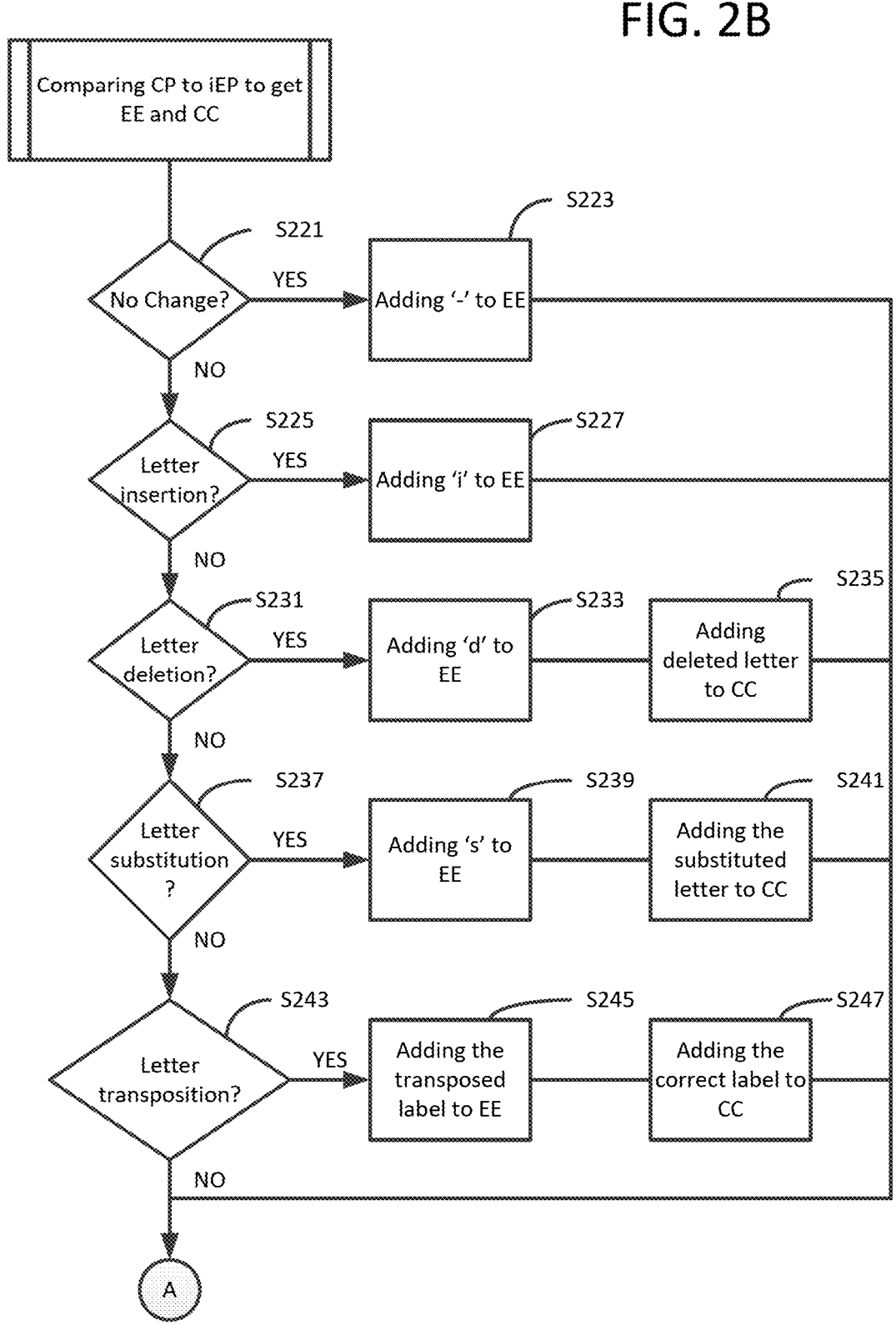

FIGS. 2A, 2B is a flowchart for the error-correct patterns generator according to an exemplary aspect of the disclosure. The error-correct patterns generator produces an error model by learning the types and forms of the language patterns from an annotated corpus. In producing the error model, the error-correct patterns generator analyzes the type of error.

Regarding, FIGS. 2A, 2B, a pair of a correct word CW (morphological pattern) and an error word EW (real word error) and used to generate an error pattern EP. The ECPG component 101 may generate all the error patterns with the respective correction information from an annotated error corpus with the help of any morphological patterns generator. For purposes of explaining a non-limiting example of this disclosure, the SWAM morphological analyzer (Affendi) may be used. For any error word, the corresponding correction may be morphologically analyzed using SWAM to get its morphological pattern and affixes.

The flowchart in FIGS. 2A, 2B is for a pair of a correct word CW and an error word EW. The steps in the flowchart may be repeated for all pairs of correct words and error words. Regarding FIG. 2A, in step S201, a real word error EW and a morphological pattern CW that was provided by the morphological analysis is provided as an input to the error correct pattern generator 101. In step S203, a label is applied to all non-overlapping Longest Common Substrings (LCS) which are common substrings between the Correct Word (CW) and Error Word (EW) (In an exemplary aspect, labels are chosen from the English Alphabet A, B, C, . . . , Z). In step S205, a label is applied to the Correct Pattern (CP) according to Correct Word's (CW) label. In step S207, the initial Error Pattern EP (iEP) is made the labeled Error Word (EW) by replacing each label with its corresponding character in the Correct Pattern (CP). In steps S209, S211, a loop is performed over each character in the labeled CP and each character in the labeled iEP.

Regarding FIG. 2B, the step S211 of comparing CP to iEP to get Error Encoding (EE) and Correction code (CC) is shown in detail. If there is No Change (YES in S221): in S223, '-' is added to EE. If there is letter insertion (YES in S225): in S227, 'i' is added to EE. If there is letter deletion (YES in S231): in S233, 'd' is added to EE; in S235, the deleted letter is added to CC. If there is letter substitution (YES in S237): in S239, 's' is added to EE; in S241, the substituted letter is added to CC. If there is letter transposition (YES in S243): in S243, the transposed label is added to EE; in S247, the correct label is added to CC. In S213, the final EP is extracted according to EE and iEP.

Figure 3:
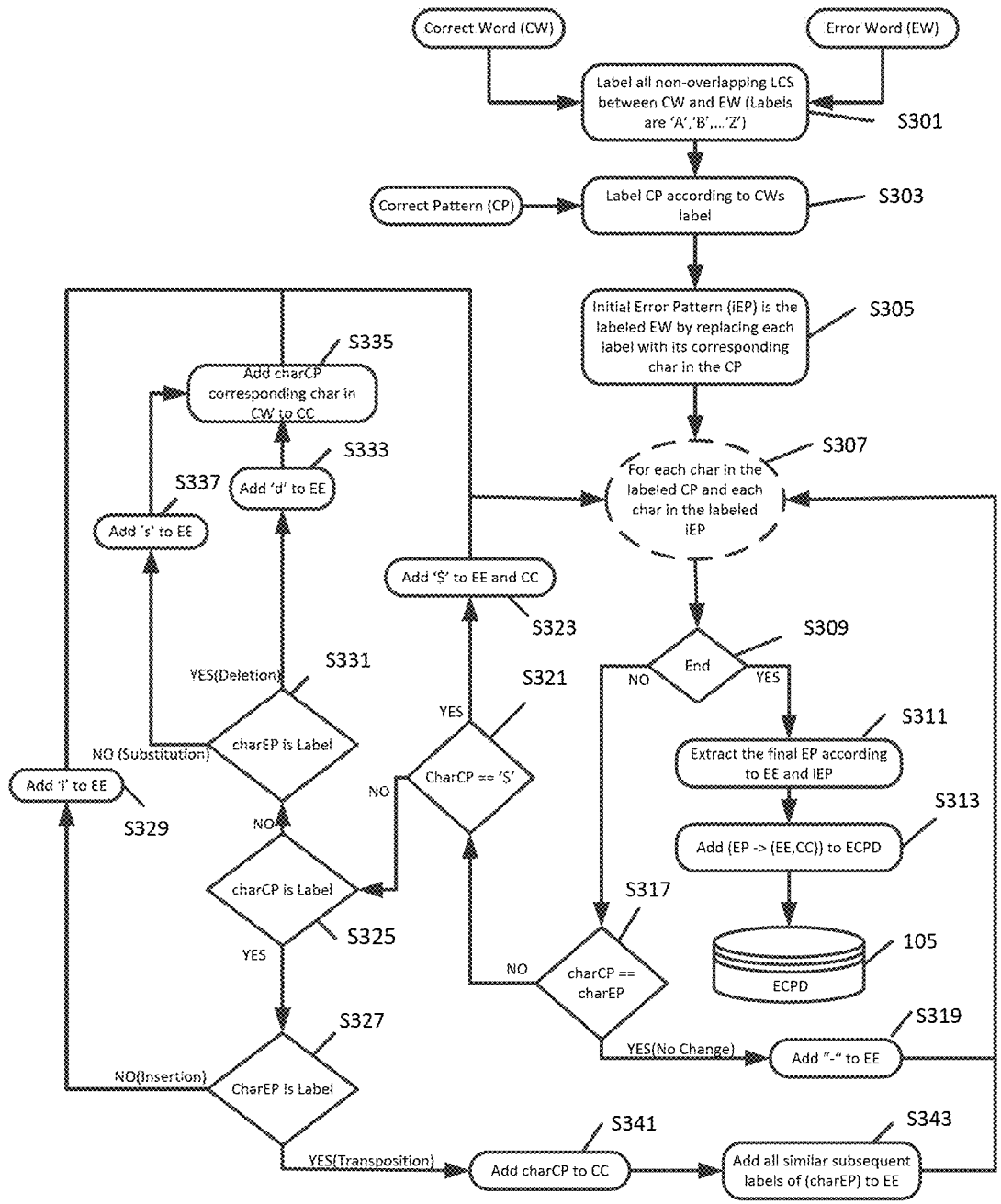
FIG. 3 is a flowchart for the error-correct patterns generator algorithm according to an exemplary aspect of the disclosure.
Figure 6:
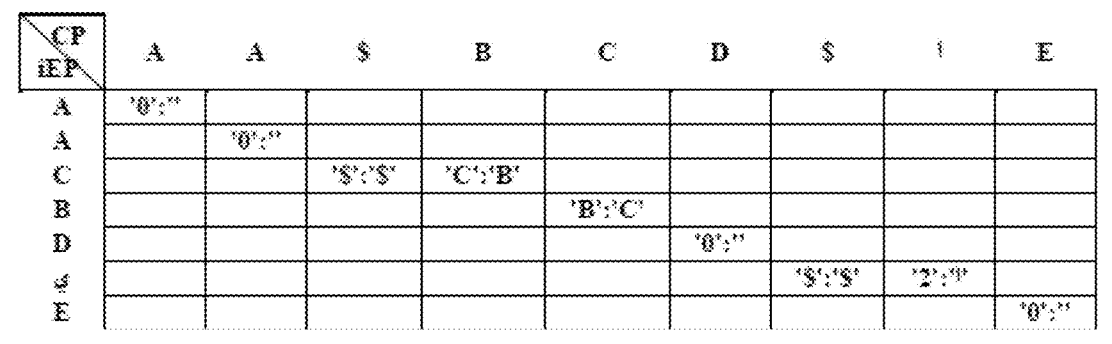

FIG. 3 is a flowchart for the error-correct patterns generator algorithm according to an exemplary aspect of the disclosure. The example is carried out using the error correct pattern generator algorithm described in FIGS. 2A, 2B. The steps of the algorithm applied to the example are illustrated in FIGS. 5 and 6, with FIG. 6 showing the details of the loop S209 and S211 of the algorithm. As mentioned above, for any error word, the corresponding correction may be morphologically analyzed using SWAM to get its morphological pattern and affixes. In the example of FIG. 3, given the real word error 'الرحمين' in the context of 'من النوم أسباب', the correction word 'الحرمان' is analyzed using SWAM, and as a result is identified as 'الْحِرْمَانْ' with morphological pattern 'الْفِعْلَانْ'. The morphological pattern and the real word error are used to generate an error pattern 'الْفِعْلَيْنْ', as shown in FIG. 3.

Regarding FIG. 3, in step S301, a label is applied to all non-overlapping Longest Common Substrings (LCS) which are common substrings between Correct Word (CW) and Error Word (EW) (In an exemplary aspect, labels are chosen from the English Alphabet A, B, C, . . . , Z). An example of this step is shown in "Step 1" in FIG. 5A, which shows the input CW and EW and resulting labels CW Label and EW Label. In step S303, a label is applied to the Correct Pattern (CP) according to Correct Word's (CW) label. An example of this step is shown in "Step 2" in FIG. 5A, which shows the resulting labeled CP. In step S305, the initial Error Pattern EP (iEP) is made the labeled Error Word (EW) by replacing each label with its corresponding character in the Correct Pattern (CP). An example of this step is shown in "Step 3" in FIG. 5A, which shows the resulting labeled iEP. In step S307, a loop is performed over the whole letters, in particular, each character in the labeled CP and each character in the labeled iEP. An example of the results from the loop is shown in "Step 4" in FIG. 5B, which shows the resulting EE and CC.

The error encoding EE which is generated in this example is a string that specifies the positions of the changes and the change types in the error pattern. In the example, there are two changes: transposition of the first two characters of the surface pattern (BC in CP Label) and a substitution of the first character in the suffix ('). Hence, the resulting error encoding (EE) is '-s$-BCS--', according to the error types listed in FIG. 4. Finally, the corrections that are to be applied are generated, which specify the actual changes. These corrections are denoted by the correction codes (CC). In the example, the correction code is 'I$CBS', which specifies the transposed and substituted characters.

An example of the steps in the EE and CC generation process are shown in FIG. 6. It is noted that the patterns CP and iEP appear in reverse order to the labels CP Label and iEP Label in "Step 4' of FIG. 5B. The first value in each box is for the EE and the second value is for the CC.

In S317, the character in CP is compared to the character in iEP. If a comparison between the character in CP and the character in iEP indicates that there is No Change (YES in S317): in S319, error code '-' is added to Error Encoding (EE). If the CP character is not a label but an affix position character ('S') (YES in S321), in S323, the affix position character ('$') is added to both EE and CC. If the character in CP is a label (YES in S325), and the character in iEP is not a label (NO in S327), there is letter insertion: in S329, error code 'i' is added to EE. If there is letter deletion (YES in S331): in S333, 'd' is added to EE; in S335, the deleted letter is added to Correction Code (CC). If there is letter substitution (NO in S331): in S337, 's' is added to EE; in S335, the substituted letter is added to CC. If there is letter transposition (YES in S327): in SS341, the character in CP label is added to CC; in S343, the correct label is added to EE. In S311, the final EP is extracted according to EE and iEP. The results of this step are shown in "Step 5" in FIG. 5B.

Figure 7:
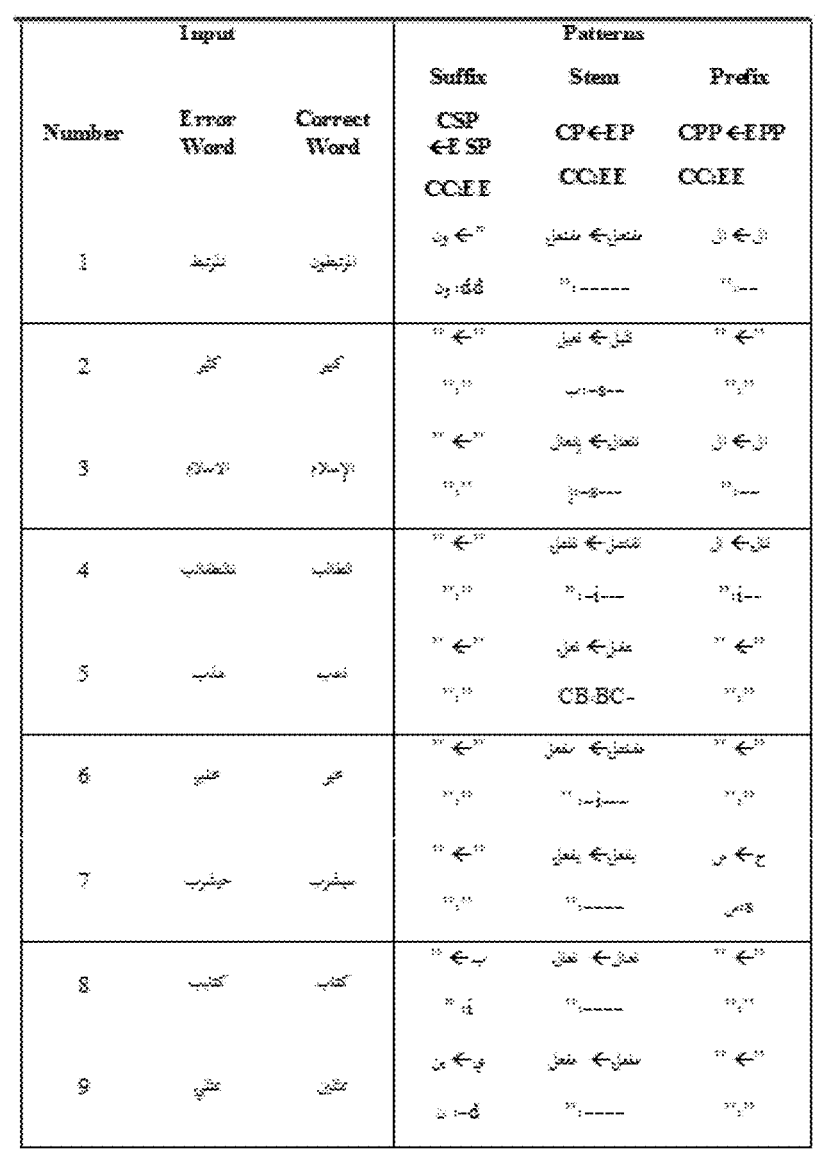

FIG. 7 shows samples of different error patterns that affect prefixes (number 4 and 7), stems (numbers 2-6) and suffixes (numbers 1, 8 and 9).

Error Correct Patterns Database (ECPD)

Figure 8:
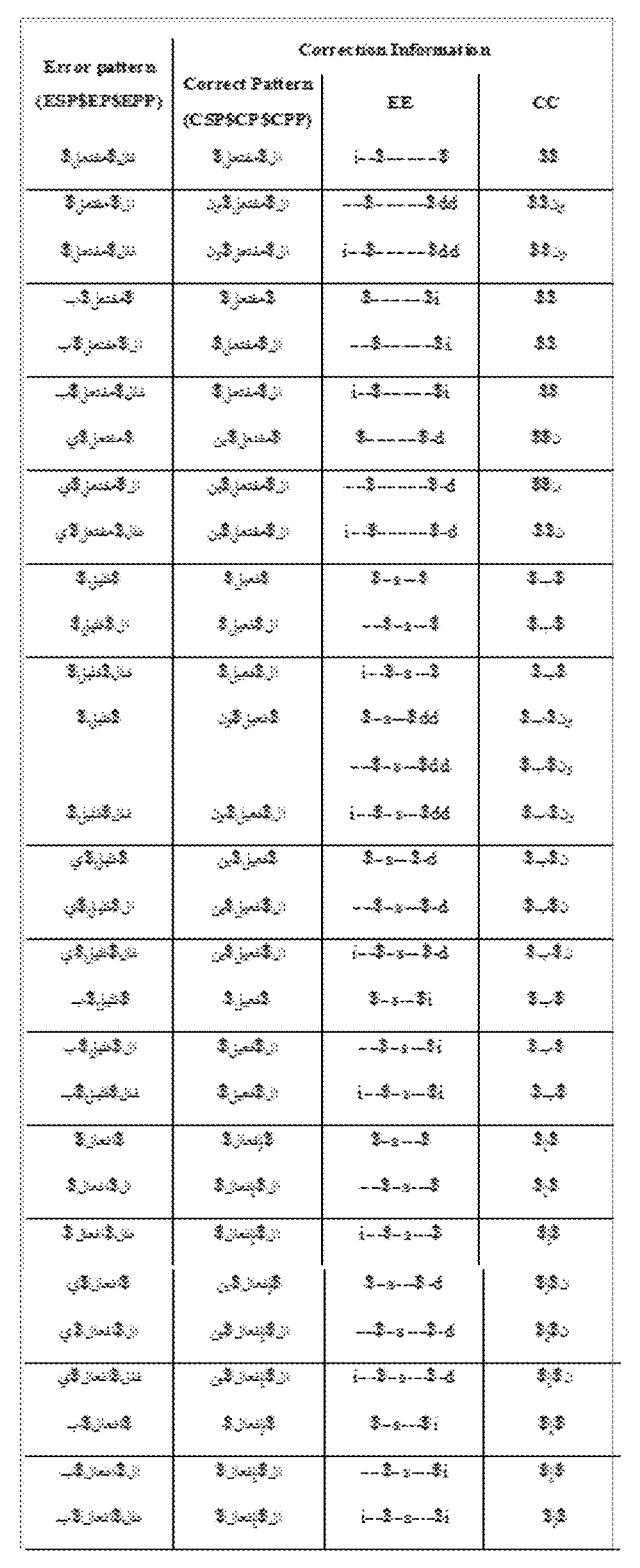

The generated error patterns, error encodings and correction codes are stored in the ECPD 105. FIG. 8 is an example of data for the error correct patterns database according to an exemplary aspect of the disclosure. ECPD 105 is a database that holds the error patterns with their correction information. The database is created by, first, including the patterns generated by the ECPG 101. Then, for each correct stem (i.e. not containing any error), component 103 examines all combinations of prefixes and suffixes, where at least one of them (the prefix or the suffix) has an error. If the combination satisfies the condition that the stem is compatible with the correct affixes, such combination are stored to the ECPD. For incorrect stems, the same procedure applies with the difference that both affixes can be correct. Again, the compatibility check is only considered against the correct stem and correct affixes. For example, the table in FIG. 7 contains error patterns that are generated from the first three rows of the table in FIG. 8. The error and correct patterns information are stored using dictionaries according to the error pattern length. Searching for an error pattern is, therefore, started by computing the length of the error word and considering the dictionary corresponding to that length.

Correct Candidates' Generator (CCG)

Figure 9:
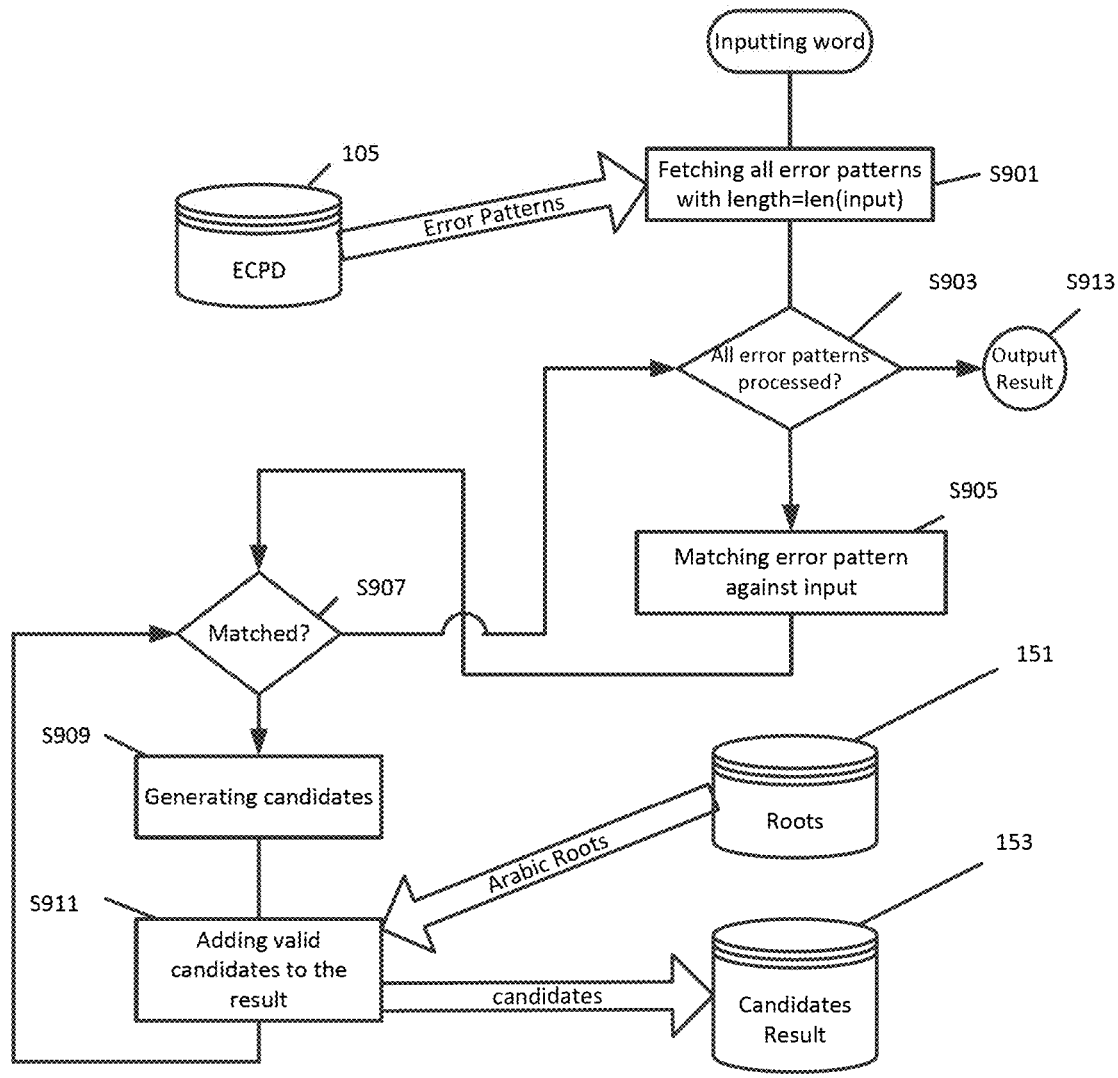
FIG. 9 is a flowchart for the correction candidates generator according to an exemplary aspect of the disclosure.

FIG. 9 is a flowchart for the correction candidates' generator according to an exemplary aspect of the disclosure. The correction candidates' generator 107 is a data driven component that uses error patterns to generate correction candidates for a given word. It considers the correction information stored at the EPCD 105 that corresponds to the error pattern.

Regarding FIG. 9, a particular error word is input to the CCG 107 in order to obtain correction candidates. In S901, the length of the error word is computed and error patterns stored in the ECPD 105 are searched based on the length. The ECPD 105 returns all error patterns having that length. In S903, a decision is made to determine if all of the error patterns have been considered. After consideration of all error patterns, a list of valid candidates is output in S913, and may be displayed to a user. Otherwise, in S905, matching occurs if all the morphological pattern letters other than ('ف, ع, ل,') match their corresponding letters in the error word. In S909, matching patterns are generated. In S911, matching patterns are evaluated to determine if they have a valid root. Correction candidates that have a valid root are added to a list of valid candidates. The CCG 107 continues until all error patterns are considered.

An example is provided as shown in FIG. 10. In the example, given a particular error word (EWord), e.g. 'فالمستمع', the CCG 107 matches all the morphological error patterns, similar in length to the input, against the input error word and generates all the correction candidates according to the matched patterns correction information. In FIG. 10, the columns CSP, CP and CPP are correction information. Also, see the correction information in FIG. 8. The matching occurs if all the morphological pattern letters other than (' ف, ع, ل,') match their corresponding letters in the error word. Non-valid candidates are automatically rejected as possible candidates; a correction (Correction) is valid (Valid=True) if it has a valid root (Root). According to the example database in FIG. 8, only the pattern (Pattern) 'فالمفتعل' provides valid candidates.

Figure 11:
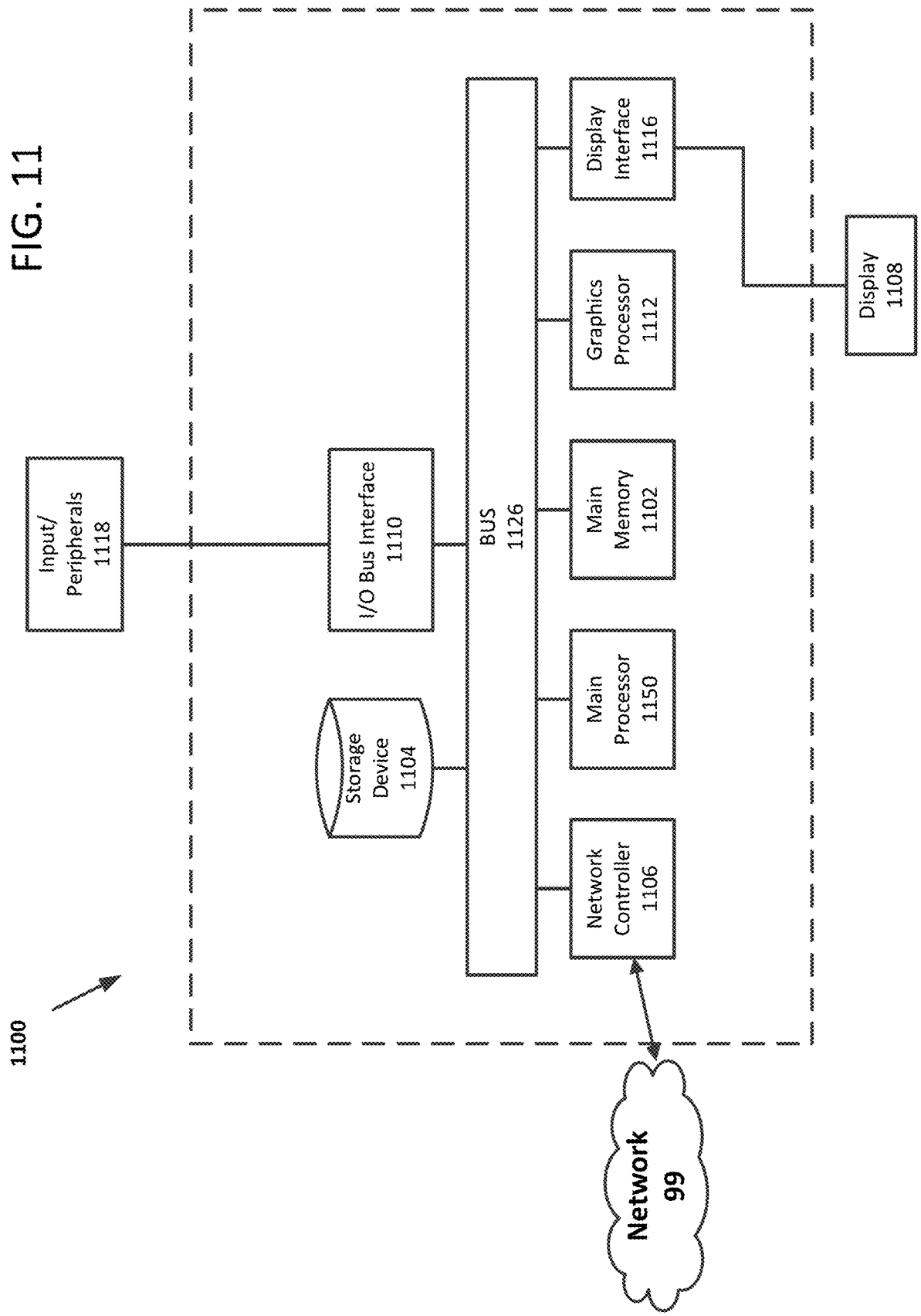
FIG. 11 is a block diagram of an example computer system according to an exemplary aspect of the disclosure.

In one implementation, the functions and processes of the system of FIG. 1 may be implemented by a computer 1126. Next, a hardware description of the computer 1126 according to exemplary embodiments is described with reference to FIG. 11. In FIG. 11, the computer 1126 includes a CPU 1100 which performs the processes described herein. The process data and instructions may be stored in memory 1102. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 1126 communicates, such as a server or computer.

Further, the claimed advancements may be provided as a utility application, background daemon, or component of an operating system, or combination thereof, executing in conjunction with CPU 1100 and an operating system such as Microsoft® Windows®, UNIX®, Oracle® Solaris, LINUX®, Apple macOS® and other systems known to those skilled in the art.

In order to achieve the computer 1126, the hardware elements may be realized by various circuitry elements, known to those skilled in the art. For example, CPU 900 may be a Xenon® or Core® processor from Intel Corporation of America or an Opteron® processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 900 may be implemented as multiple processors cooperatively working in parallel to perform the instructions of the inventive processes described above.

The computer 1126 in FIG. 11 also includes a network controller 906, such as an Intel Ethernet PRO network interface card from Intel Corporation of America, for interfacing with network 1124. As can be appreciated, the network 1124 can be a public network, such as the Internet, or a private network such as LAN or WAN network, or any combination thereof and can also include PSTN or ISDN sub-networks. The network 1124 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1126 further includes a display controller 1108, such as a NVIDIA® GeForce® GTX or Quadro® graphics adaptor from NVIDIA Corporation of America for interfacing with display 1110, such as a Hewlett Packard® HPL2445w LCD monitor. A general purpose I/O interface 1112 interfaces with a keyboard and/or mouse 1114 as well as an optional touch screen panel 1116 on or separate from display 1110. General purpose I/O interface also connects to a variety of peripherals 1118 including printers and scanners, such as an OfficeJet® or DeskJet® from Hewlett Packard®.

The general purpose storage controller 1120 connects the storage medium disk 904 with communication bus 1122, which may be an ISA, EISA, VESA, PCI, or similar, for interconnecting all of the components of the computer 1126. A description of the general features and functionality of the display 1110, keyboard and/or mouse 1114, as well as the display controller 1108, storage controller 1120, network controller 906, and general purpose I/O interface 1112 is omitted herein for brevity as these features are known.

System Analysis

To study the effectiveness of the suggested error model, an analysis of some well-known Arabic annotated corpora was conducted. The analysis is concentrated on the types and number of edits needed to get the correct word from the error word. The corpus chosen for this task is that of QALB. QALB is a manually annotated errors corpus consisting of user comments collected from the Al-Jazeera News webpage. They are, mainly, written in Modern Standard Arabic. It is mainly written in Modern Standard Arabic with almost one Million words with 243,075 errors. QALB has its specific format. However, its format was converted into KACST format. The corpus files are then fed to the morphological analyzer (SWAM) to get the morphological pattern of the corpus words. The corpus has different types of errors, some of errors are annotated with more than three words as correction. Only sentences that have, among their errors, less than four connected words were included; the reason behind this exclusion is that such errors are fairly unique and they introduce overhead over the morphological analyzer disambiguation process.

Table 1 shows the summary of the QALB corpus errors based on the error model analysis result file. The deletion error type ratio (%40.18) in Table 1 includes the percentage of punctuation deletion which is %33.45.

TABLE 1

QALB corpus errors summary

| Error Type | QALB Count | Ratio |
|---|---|---|
| Insertion | 19270 | 7.93 |
| Deletion | 97668 | 40.18 |
| Substitution | 106702 | 43.90 |
| Transposition | 530 | 0.22 |
| Mixed | 18905 | 7.78 |
| No Change | 23 | 0.01 |
| Totals | 243075 | 100 |

Most of the errors in QALB are repeated errors, the total number of distinct corpus errors is 89536 as shown in Table 2. The total number of distinct errors consists of uniquely occurred errors (Non-Repeated error words, 68253) and the distinct number of repeated error words (21283).

TABLE 2

Corpus error patterns statistics

| Error Type | QALB Count | Ratio |
|---|---|---|
| Non-Repeated Corpus Errors | 68253 | %76.23 |
| Repeated Corpus Errors (Distinct) | 21283 | %23.77 |
| Total Distinct Corpus Errors | 89536 | 100% |

The summary statistics of the QALB corpus error patterns based on the error model analysis result file are shown in Table 3Table.

TABLE 3

QALB error patterns summary

| Error Type | QALB Count | Ratio |
|---|---|---|
| Insertion | 6834 | (63.34) |
| Deletion | 17786 | (39.33) |
| Substitution | 9965 | 47.32 |
| Transposition | 414 | 86.97 |
| Mixed | 11130 | 92.83 |
| No Change | 19 | 95.00 |
| Totals | 46129 | 51.52 |

The total number of distinct generated error patterns is 46129 as shown in Table 4. The generated total distinct error patterns are composed of uniquely generated patterns (Non-Repeated error patterns, 68253) and the distinct number of repeated error patterns (21283).

TABLE 4

Corpus error patterns statistics

| Error Type | QALB Count | Ratio |
|---|---|---|
| Non-Repeated Error Patterns | 32826 | 36.66 |
| Repeated Error Patterns (Distinct) | 13303 | 14.86 |
| Total Distinct Error Patterns | 46129 | 51.52 |

With the fact that the total number of the analyzed corpus errors is 243075; the statistics show that almost 71% (243075−68253=174822) of these errors are just a repetition of only 21283 distinct errors with an average of almost 8 occurrence per error word. The remaining 29% of the corpus errors are singly occurred errors (non-repeated errors). This means that any upcoming error word should have their correction candidate in the list (if a simple non-error patterns model is used) with the probability of at least 71%.

Although, the number of uniquely occurred errors in the corpus is 68253 which is almost triple the number of distinct repeated errors; the total number of the whole generated error patterns by the error model is 46129 (51.52% of the whole distinct corpus errors).

We conducted an analysis of the actual error model candidates' generation effectiveness compared to the Levenshtein minimum edit distance based on QALB test corpus. The experiment concentrated on the ability of the error model, based on the learnt error patterns, to generate the correct candidates among all the suggested candidates. The ranking of candidates was handled based on the error pattern repetition frequency. Different training corpora were used to train the error model. For example, Table 5 shows that, in case of using QALB training data, 83% of the correct correction does exist in the generated correction candidates. The average number of candidates is 20 and the average candidates' generation time is 0.11. Moreover, almost 0.17% of the corrections are exist among the top correction.

TABLE 5

Results of effectivness of the error model based on QALB test data

| Training Corpus | | Avg. # of generated candidates | Avg. # of error correction to exist in all candidates | Avg. # of error correction to exist as 1-Top candidate | Avg. candidates' generation time (second) |
|---|---|---|---|---|---|
| QALB | all | 50.62551 | 0.846904 | 0.174923 | 0.331455 |
| | 3 | 20.19227 | 0.834396 | 0.174801 | 0.117919 |
| | 5 | 17.75917 | 0.832005 | 0.174801 | 0.108445 |
| | 10 | 14.64972 | 0.812937 | 0.174555 | 0.076993 |
| | 20 | 11.75377 | 0.797241 | 0.17431 | 0.064977 |
| | 50 | 8.80233 | 0.772471 | 0.171613 | 0.042568 |
| | 100 | 6.892336 | 0.511833 | 0.170509 | 0.026233 |
| KFUPM | all | 4.28786 | 0.325996 | 0.203495 | 0.030914 |
| | 3 | 1.554874 | 0.304476 | 0.202207 | 0.013846 |
| | 5 | 1.148498 | 0.297548 | 0.200184 | 0.010643 |
| | 20 | 0.744513 | 0.25187 | 0.177253 | 0.007047 |
| | 50 | 0.617351 | 0.240834 | 0.169896 | 0.006288 |
| | 500 | 0.520907 | 0.23599 | 0.167443 | 0.006002 |
| QALB&KFUPM | all | 51.78026 | 0.851441 | 0.206131 | 0.498713 |
| | 3 | 20.72495 | 0.838994 | 0.20607 | 0.125295 |
| | 5 | 18.13673 | 0.836419 | 0.206009 | 0.110816 |
| | 10 | 14.98982 | 0.817351 | 0.205763 | 0.078692 |
| | 50 | 8.987554 | 0.779583 | 0.204169 | 0.059371 |
| | 100 | 7.139608 | 0.519436 | 0.203004 | 0.027957 |

In the case of Levenshtein minimum edit distance, the candidates were generated using an edit distance of 1 and 2. The candidates with the required edit distance are generated from a dictionary[1] with 125975 words. Candidates' generation within the edit distance of 3 was not included since the generation time was very large (almost 33 minutes/error word) and the memory requirements were huge (4800 candidates/error word).

TABLE 6

Summary of the accuracy of correction candidates and the execution time needed.

| Training Corpus | | Avg. # of generated candidates | Avg. # of error correction to exist in all candidates | Avg. candidates' generation time |
|---|---|---|---|---|
| Edit Distance | 1 | 19.1279 | 0.817781 | 9.772839 |
| | 2 | 440.641 | 0.856714 | 3.423594 |

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data-driven spell checking computer system for a language, the computer system including one or more processors, the computer system comprising:
an error-correct patterns generator that learns types and forms of the language's morphological patterns from an annotated corpus, and analyzes types of errors using the morphological patterns to generate error encodings, which are a string that specifies the positions of changes and change types in error patterns;
an error-correct patterns database managed by the one or more processors; and
a correction candidates generator performed by the one or more processors,
wherein
the error-correct patterns generator generates the error patterns based on the analysis of the types of errors, wherein the error patterns contain at least one of the language's characters and at least one affix position symbol,
the error-correct patterns database stores the error patterns and the error encodings,
the correction candidates generator generates correction candidates by, for a particular word error,
matching all the error patterns, having a length equal to the word error, against the word error, and
generating all the correction candidates according to the matched error patterns' error encodings.

2. The data-driven computer system of claim 1, wherein generated correction candidates are checked to determine if they contain a valid root, the correction candidates generator outputting correction candidates that have a valid root.

3. The data-driven computer system of claim 1, wherein the error-correct patterns generator
for a word error, morphologically analyzes the corresponding correction to get one or more word error's morphological patterns;
generates one or more error patterns using the pairs of morphological patterns and the corresponding word error; and
generates the error encoding and correction codes.

4. The data-driven computer system of claim 3, wherein the generated error patterns, error encodings and correction codes are stored in the error-correct patterns database.

5. The data-driven computer system of claim 3, wherein the error encoding includes at least one of no change, transposition of two characters, insertion, deletion, and substitution.

6. The data-driven computer system of claim 1, wherein the error-correct patterns database is created by:
storing error patterns generated by the error-correct patterns generator;
for each correct stem, examining all possible combinations of prefixes and suffixes, where at least one of the combinations has an error, adding combinations that satisfy the condition that the stem is compatible with the correct affixes to the database; and
storing the error patterns with and correction information using dictionaries according to the length of the error pattern.

7. The data-driven computer system of claim 1, wherein the language is Arabic.

8. The data-driven computer system of claim 1, wherein the language is a Semitic language.

9. The data-driven computer system of claim 1, wherein the correction candidates generator generates correction candidates by,
for a particular word error, matching all the error patterns, having a length equal to the word error, against the word error in order to minimize the number of correction candidates in which the correction candidates contain a correct correction.

10. A non-transitory computer-readable storage medium storing a spell checking program and a database,
when executed by a computer, the spell checking program performs
an error-correct patterns generation process, including:
learning types and forms of the language's morphological patterns from an annotated corpus;
analyzing types of errors using the morphological patterns to generate error encodings, which are a string that specifies the positions of changes and change types in an error pattern;
generating the error patterns based on the analysis of the types of errors, wherein the error patterns contain at least one of the language's characters and at least one affix position symbol; and
storing the error patterns and the error encodings in the database, and
a correction candidate generation process, including:
inputting a particular word error; and
generating correction candidates for the word error by,
matching all the stored error patterns, having a length equal to the word error, against the word error, and
generating all the correction candidates according to the matched error patterns' error encodings.

11. The computer-readable storage medium of claim 10, wherein the language is Arabic.

12. A spell checking method performed by one or more processors, wherein the one or more processors manage a database that stores error patterns, the method performed by the one or more processors comprising:
learning types and forms of the language's morphological patterns from an annotated corpus;
analyzing types of errors using the morphological patterns to generate error encodings, which are a string that specifies the positions of changes and change types in an error pattern;
generating the error patterns based on the analysis of the types of errors, wherein the error patterns contain at least one of the language's characters and at least one affix position symbol;
storing the error patterns and the error encodings in the database;
inputting a particular word error; and
generating correction candidates for the word error by,
matching all the stored error patterns, having a length equal to the word error, against the word error, and
generating all the correction candidates according to the matched error patterns' error encodings.

13. The method of claim 12, wherein the generating of correction candidates further comprises
checking the generated correction candidates to determine if they contain a valid root; and
outputting correction candidates that have a valid root.

14. The method of claim 12, wherein
the learning includes:
for a word error, morphologically analyzing the corresponding correction to get one or more word error's morphological patterns; and
the analyzing the types of errors includes:
generating one or more error patterns using the pairs of morphological patterns and the corresponding word error;
generating the error encoding; and
generating corrections corresponding to the error encoding that need to be applied to the word error, denoted by correction codes.

15. The method of claim 14, wherein the generated error patterns, error encodings and correction codes are stored in the database.

16. The method of claim 14, wherein the error encoding includes at least one of no change, transposition of two characters, insertion, deletion, and substitution.

17. The method of claim 12, wherein the database is created by:
storing the generated error patterns;
for each correct stem, examining all possible combinations of prefixes and suffixes, where at least one of the combinations has an error, adding combinations that satisfy the condition that the stem is compatible with the correct affixes to the database; and
storing the error patterns with and correction information using dictionaries according to the length of the error pattern.

18. The method of claim 12, wherein the language is Arabic.

19. The method of claim 12, wherein the language is a Semitic language.

* * * * *